(12) United States Patent
Chung Geon et al.

(10) Patent No.: US 7,774,595 B2
(45) Date of Patent: Aug. 10, 2010

(54) COMPUTER SECURITY APPARATUS AND METHOD USING SECURITY INPUT DEVICE DRIVER

(75) Inventors: Oh Chung Geon, Seoul (KR); Choi Kwang Wol, Seoul (KR); Sung Kwi Chul, Seoul (KR); Kim Dae Hyeong, Seoul (KR); Kim Seong Il, Seoul (KR)

(73) Assignee: King Information & Network, Seoul (KR)

( * ) Notice: Subject to any disclaimer, the term of this patent is extended or adjusted under 35 U.S.C. 154(b) by 1110 days.

(21) Appl. No.: 11/050,732

(22) Filed: Feb. 7, 2005

(65) Prior Publication Data

US 2005/0177649 A1    Aug. 11, 2005

(30) Foreign Application Priority Data

Feb. 5, 2004    (KR) .................... 10-2004-0007614

(51) Int. Cl.
    G06F 3/00    (2006.01)
(52) U.S. Cl. .................... 713/154; 713/164; 713/190; 710/1; 710/260; 726/16; 726/25
(58) Field of Classification Search .................... 710/1, 710/260; 713/154, 189–190, 164; 726/16, 726/22, 25
    See application file for complete search history.

(56) References Cited

U.S. PATENT DOCUMENTS

| 2003/0070013 A1* | 4/2003 | Hansson ............ 710/59 |
| 2003/0187914 A1* | 10/2003 | Kaniyar et al. ............ 709/201 |
| 2004/0032423 A1* | 2/2004 | Nason et al. ............ 345/746 |
| 2004/0215971 A1 | 10/2004 | Nam |
| 2005/0071531 A1* | 3/2005 | Oshins ............ 710/260 |

FOREIGN PATENT DOCUMENTS

| CN | 1383069 | 12/2002 |
| JP | 61208529 A * | 9/1986 |
| JP | 06309229 A * | 11/1994 |
| JP | 2001-125747 | 5/2001 |
| JP | 2003-099144 | 4/2003 |
| KR | 2002-0048313 | 6/2002 |
| KR | 1020020089849 | 11/2002 |
| KR | 10-0378586 | 3/2003 |
| KR | 2003-0036276 | 5/2003 |
| KR | 10-2004-0066237 | 7/2004 |

(Continued)

OTHER PUBLICATIONS

*Intel 64 and IA-32 Architectures Software Developer's Manual; volume 3A: System Programming Guide, Part 1*, pp. 5-12 to 5-14.

Primary Examiner—Benjamin E Lanier
Assistant Examiner—Hadi Armouche
(74) Attorney, Agent, or Firm—Lowe Hauptman Ham & Berner LLP (57) ABSTRACT

Provided is a computer security apparatus and a method using a security input device driver. Data inputted through a data input unit is directly encrypted at the security input device driver without passing through an OS input device driver supporting in an OS. Thereby, the data inputted through the data input unit can be prevented from being illegally acquired by any hacking program from the beginning.

4 Claims, 10 Drawing Sheets

| | FOREIGN PATENT DOCUMENTS | |
|---|---|---|
| KR | 10-0447777 | 8/2004 |
| KR | 10-2004-0092101 | 11/2004 |
| WO | 01/10079 | 2/2001 |
| WO | WO 01/10079 | 2/2001 |
| WO | 02/08873 | 1/2002 |

* cited by examiner

COMPUTER SECURITY APPARATUS AND METHOD USING SECURITY INPUT DEVICE DRIVER

CROSS-REFERENCE TO RELATED APPLICATIONS

This application claims the benefit of Korean Patent Application No. 2004-0007614, filed on Feb. 5, 2004, in the Korean Intellectual Property Office, the disclosure of which is incorporated herein by reference.

1. FIELD OF THE INVENTION

The present invention relates generally to computer security and, more particularly, to a computer security apparatus and method replacing an input Interrupt Service Routine (ISR) of an operating system (OS) registered in an Interrupt Descriptor Table (IDT) with a security input ISR. With this configuration, data inputted from a data input unit such as a keyboard are processed by the security input ISR rather than the OS input ISR, so that it makes possible to protect user's keystroke data from being illegally acquired by hacking programs.

2. DESCRIPTION OF THE RELATED ART

Currently, with rapid development of computer and Internet technologies, important business applications such as Internet banking and home trading service (HTS) are being executed by an aid of computer. However, this computer-based business applications can maliciously be exploited for example, by Spyware and keystroke loggers. These Spyware and keystroke loggers maliciously acquire, record and transmit users inputted data through a means of data input unit to identity thieves. This kind of hacking methods that constitute identity theft are on a rapid rise.

In order to circumvent these problems, a variety of tools have been developed and being sold. These tools generally detect and remove malicious programs—Spyware and Keystroke loggers—from users' computers, so called Anti-Virus, Anti-Spyware and Personal Firewalls. However, in the case of deformed and newly introduced malicious programs, the current tools become obsolete until a known remedy is found: a method of acquiring, analyzing, and removing the deformed malicious programs, usually done through updating virus definitions.

In order to overcome this shortcoming, there are introduced methods for receiving the input data directly from a system and securely transmitting it to application programs to prevent the malicious programs from intercepting input data. The reference documents in which these methods are disclosed are as follows: Korean Patent Publication No. 2002-48313 (titled Keyboard Anti-Hacking Method), Korean Patent No. 0378586 (titled ActiveX-based Keyboard Anti-Hacking Method and Apparatus), Korean Patent Publication No. 2004-92101 (titled Using Virtual Keystroke Data Transmission for Keystroke Hacking Protect), Korean Patent Publication No. 2004-66237 (titled Key Input Fraud Detection Method), Korean Patent No. 0447777 (titled Anti-Hacking Method of Key Stroke Data and Computer-Readable Recording Medium of recording the same), and Korean Patent Publication No. 2003-36276 (titled Computer Security System Using Security Input Device Driver).

As a representative of the above-mentioned prior patent documents, Korean Patent No. 0378586 is introduced. This patent discloses a security program having an AcitiveX format for web browsers and application programs, and it comprises a software security input window for protecting keystroke data. This security program protects keyboard data on the web browsers and application programs. However, with this configuration, the leakage of the input data can be prevented only at the application program level. That is to say, if a filter driver intercepting the input data prior to a security device driver is used or a hacking program resides at a level lower than the application program, this patent is powerless.

Figure 1:
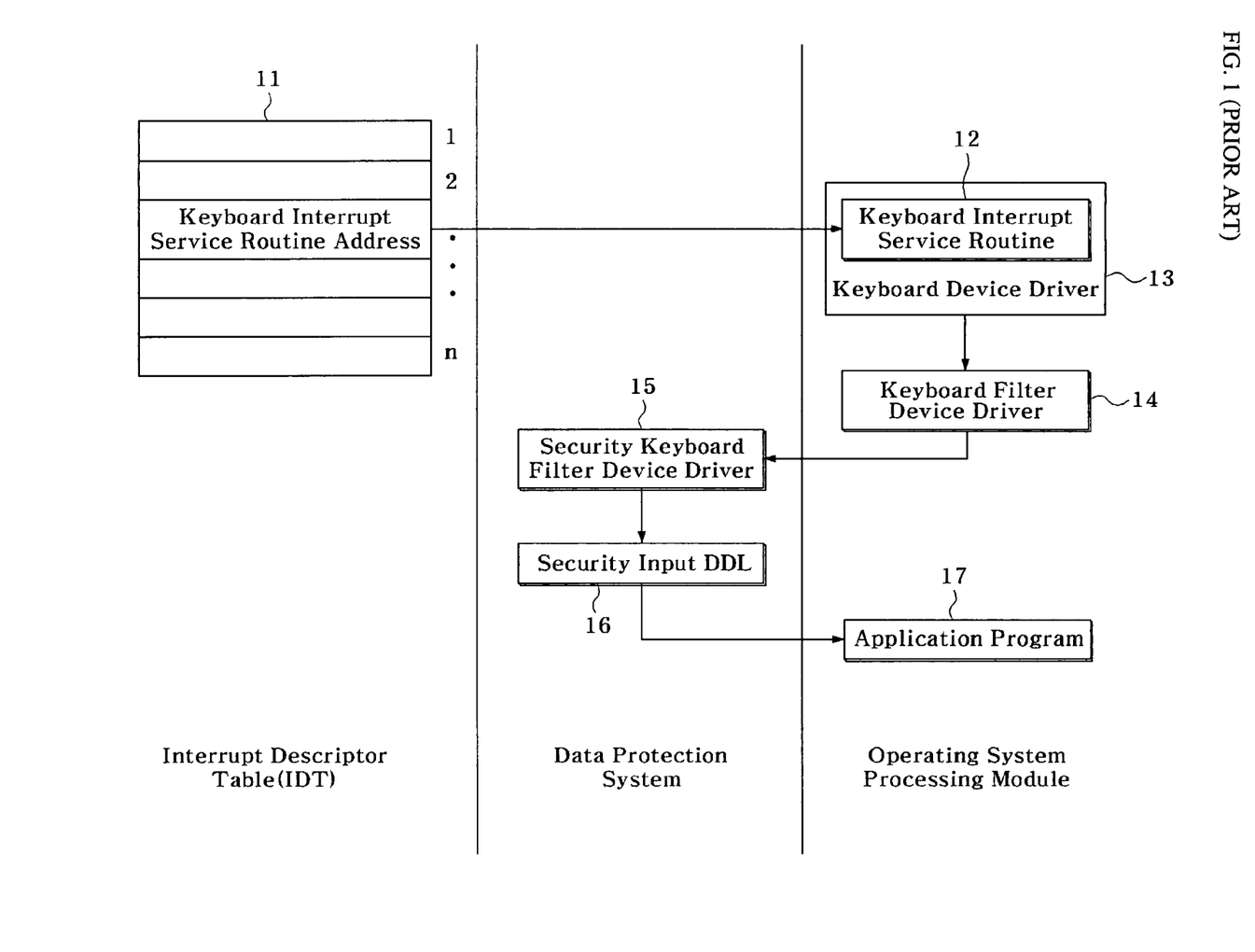
FIG. 1 is a conceptual diagram for explaining a conventional computer security apparatus.

Hereinafter, a conventional computer security apparatus will be described with reference to FIG. 1. FIG. 1 is a conceptual diagram for explaining the conventional computer security apparatus. Specifically, a method of protecting data inputted through a keyboard, as one of data input units, will be described.

When the keyboard is operated, the OS executes a keyboard ISR 12 with reference to an address of the keyboard ISR which is stored in an IDT 11. The keyboard ISR 12 converts data inputted from the keyboard via a keyboard device driver 13 into a scan code that is available in an application program. The data converted into the scan code are transmitted to a security keyboard filter device driver 15 via a keyboard filter device driver 14 and are encrypted. Then the encrypted data are decrypted at a decryption DLL (Dynamic Link Library) 16 and transmitted to an application program 17.

Through this process, the data inputted through a keyboard is encrypted at the security keyboard filter device driver 15 via a keyboard process module that is embedded in the OS. Hence, when a hacking program such as a Keystroke logger is installed in the filter driver such as the keyboard filter device driver in a step before the data being encrypted, it can preempt user's keystroke data.

In other words, with this conventional keyboard input security system, security cannot be guaranteed from a deformed Spyware and Keystroke loggers. For this reason, a new type of security method capable of fundamentally solving such problems is required.

In the mean time, most of the above-mentioned prior arts carry the similar shortcomings as described above. Furthermore, some do not properly function in actual execution. It is therefore difficult to know whether they are properly functioning and executed.

SUMMARY OF THE INVENTION

It is, therefore, an objective of the present invention to provide a new method for effectively protecting data inputted through a data input unit.

It is another objective of the present invention to prevent data from being acquired by a hacking program while passing through an operating system input device driver.

It is yet another objective of the present invention to provide methods capable of improving security in addition to a fundamental technique of storing an address of a security input ISR in an address area of an operating system input ISR.

In order to accomplish aforementioned objectives, according to a first aspect of the present invention, there is provided a computer security apparatus using a security input device driver. The computer security apparatus includes: an IDT for storing a list of addresses of functions taking charge of interrupts and storing an address of a security input ISR in a part of an address area of an operating system input ISR supported by the OS; the security input device driver for, when the interrupt is generated by an data input unit, executing the security input ISR according to the address of the security input ISR to receive data through the data input unit and encrypting the received data; and a security input unit for decrypting the data encrypted at the security input device driver and transmitting the decrypted data to an application program.

The security input device driver may include: a data input receiver for, when the interrupt is generated by the data input unit, executing the security input ISR based on the address of the security input ISR to receive data through the data input unit; a data encryptor for encrypting the data received into the data input receiver; a monitor for monitoring whether an address of the data input receiver is altered or not, the address of the data input receiver being registered in the IDT; and a controller for controlling operation of the security input device driver.

Meanwhile, the monitor may be configured to compare and verify the previously stored address of the data input receiver with an address of an area of an input ISR in the IDT corresponding to the data input unit, and in case the address of the input ISR area has been altered, and it replaces the altered address with the original address of the data input receiver.

According to a second aspect of the present invention, there is provided a computer security method using a security input device driver. The computer security method includes: when an interrupt is generated by a data input unit, driving the security input device driver with reference to an address of a data input receiver serving as a security ISR, the address of the data input receiver being previously registered in an IDT; encrypting and transmitting data received from the data input receiver; and decrypting the encrypted data and transmitting the decrypted data to an application program.

The computer security method may further include monitoring whether the address of the data input receiver registered in the IDT has been changed or not. Once the IDT has been altered (without user's permission by hacking programs), the computer security method may further include recovering the altered address back to an original address of the data input receiver again.

Meanwhile, the computer security method may further include storing a hash value and a binary code of the security ISR in advance; reading out a current hash value of the security ISR; and comparing the read hash value with the stored hash value to determine whether the two hash values are identical to each other.

Further, the computer security method may further include periodically disabling a debug extensions flag of a control register (CR4) and a debug control register (DR7).

In addition, the computer security method may further include resetting a keyboard buffer to prevent the data from being read through input and output ports for a predetermined period of time.

According to a third aspect of the present invention, there is provided a computer security method using a security input device driver. The computer security method includes: when an interrupt is generated by a data input unit, driving the security input device driver with reference to an address of a data input receiver serving as a security ISR that its address of the data input receiver being previously registered in the IDT; transmitting data received from the data input receiver to an application program; and monitoring whether the address of the data input receiver registered in the IDT is changed or not.

According to a fourth aspect of the present invention, there is provided a recording medium of recording a program for executing the computer security method using the security input device driver as mentioned above. Here, the term, recording medium, is not specially limited as long as a program for applying the security method of the present invention can be recorded. For example, products such as CDs, floppy disks, memory sticks etc. capable of being installed in each computer by a user in an off-line manner, or web servers, database etc. for storing the program in a form capable of downloading through Internet may be enumerated. Further, the term, program for executing, may include a form compressed in a known compression mode.

According to a fifth aspect of the present invention, there is provided a computer security apparatus using a security input device driver. The computer security apparatus comprises: an IDT for storing a list of addresses of functions taking charge of interrupts and storing an address of a security input ISR rather than an original input ISR that is provided by the OS; the security input device driver for, when the interrupt is generated by an data input unit, executing the security input ISR to receive data from the data input unit and encrypting the received data; and a security input unit for decrypting the data encrypted at the security input device driver and transmitting the decrypted data to an application program.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Hereinafter, preferable embodiments according to the present invention will be described with reference to the accompanying drawings. Here, when one element is connected to another element, one element may be not only directly connected to another element but also indirectly connected to another element via another element. Further, irrelative elements are omitted for clarity. Also, like reference numerals refer to like elements throughout.

Figure 2:
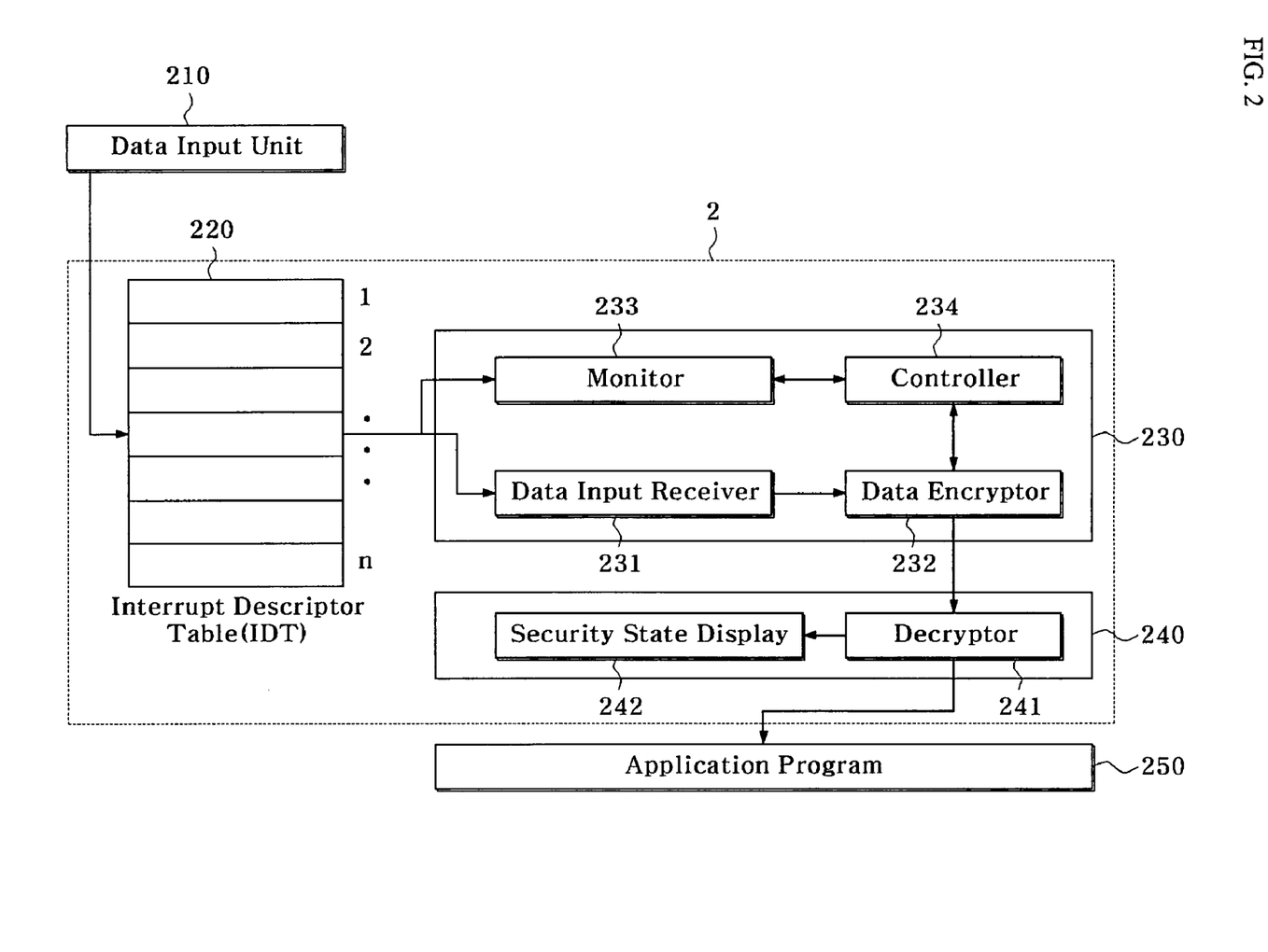
FIG. 2 shows a schematic configuration of a computer security apparatus according to an exemplary embodiment of the present invention.

FIG. 2 shows a schematic configuration of a computer security apparatus according to an exemplary embodiment of the present invention.

A function of the computer security apparatus 2 in FIG. 2 is to protect data that are inputted from a data input unit 210. The computer security apparatus 2 is composed of an IDT 220, a security input device driver 230, and a security input unit 240.

The data input unit 210 is not particularly restricted but may refer generally to all user interface units receiving data from a user of the system. For example, as the data input unit 210, a keyboard, a numeric keypad, a mouse, a joystick or so forth may be used, and preferably the keyboard may be used, which is capable of inputting a relatively large quantity of information and is widely employed to a personal computer, etc.

The IDT 220 stores a list of addresses of functions taking charge of interrupts and stores an address of a security input ISR in an address area of the OS input ISR. That is to say, the IDT 220 stores an address of a security input ISR rather than an original input ISR that is embedded in the OS.

The IDT 220 is an area provided from the OS of the system, which stores a list of addresses of functions taking charge of external interrupts, internal interrupts and exceptions. For instance, the IDT 220 is an array of 8 byte interrupt descriptors in a memory devoted to specify 256 ISRs. In this case, the first 32 entries are reserved for processor exceptions, and any other 16 entries can be used for hardware interrupts (or external interrupts). The rest are available for software interrupts (or internal interrupts). The address of the IDT 220 is stored in a processor register called "interrupt descriptor table register (IDTR)." A detailed description on the IDT inclusive of a detailed description on the relationship between the IDT and the IDTR can refer to "IA-32 Intel Architecture Software Developer's Manual, Volume 3: System Programming Guide," whose contents are incorporated herein by reference.

When data are inputted through the data input units 210, interrupts are generated, and thus an identification number of the corresponding data input unit 210 is generated. This number is called an "interrupt vector." The OS executes the ISR that is a function made for this purpose by adopting the interrupt vector as an index to locate an address of the ISR stored in the IDT 220. At this time, an address of the security input ISR driven by the security input device driver 230 is registered and stored in the IDT 220, instead of the address of the conventional input ISR provided by the OS. Therefore, when the data are inputted into the data input unit 210 and so the interrupt is generated, the security input ISR is executed.

The security input device driver 230 receives the data through the data input unit 210 on the basis of the security input ISR address registered in the IDT 220, encrypts the received data, and transmits the encrypted data to the security input unit 240. Instead of an address of the operation system input device driver, an address of the security input device driver 230 is registered in the IDT 220. Therefore, when the interrupt is generated by the data input unit 210, the conventional input ISR supported by the OS is not executed, but the security input ISR supported by the security input device driver 230 is executed.

A method of registering the address of the data input receiver 230, specifically an address of an data input receiver 231 of the input device driver 230, in the IDT 220 is various without special restriction. Preferably, an area, which is shifted by the interrupt vector of the address of the data input unit 210 within the IDT 220, may be replaced by the address of the data input receiver 231. An address of the IDT 220 is stored in the IDTR. The interrupt vector of each data input unit 210 can be acquired by using a function such as HallGetInterruptVector, for example, in the OS of WINDOWS 2000. As a result of this function, keyboard and mouse interrupt vectors are acquired. An area, which is shifted by an input device vector starting from a value of the address of the IDT 220 that is acquired in the IDTR, corresponds to an area of the address of the security input ISR. As such, the address of the data input receiver 231 may be registered in the corresponding area. The following example illustrates the case where a routine of replacing the OS keyboard ISR of a PS/2 type with the security input ISR is included in the WINDOWS 2000.

```
HookInterrupt( )
{
    nSaveVecNo = HalGetInterruptVector( Isa, 0, 1, 1, &irql,
    &Affinity );
    for ( nCpu = 0; nCpu < KeNumberProcessors; ++nCpu )
    {
        pIdtBase = GetIDTBaseAddress( );
        IDT_SetVector( pIdtBase + ( nSaveVecNo & 0xff),
(DWORD)SecuKbdISR, &OriginalISR );
    }
}
void IDT_SetVector( PNT_IDT p, DWORD SecuKbdISR, DWORD*
pSaveOffset )
{
    *pSaveOffset = (DWORD)( ( ((DWORD)p->nHighOffset) << 16 ) +
p->nLowOffset );
    p->nLowOffset = (WORD) (SecuKbdISR & 0xffff);
    p->nHighOffset = (WORD) ( ((DWORD) SecuKbdISR) >> 16 );
}
```

Among the functions, HookInterrupt( ) is for replacing a keyboard interrupt service in the IDT, SecuKbdISR( ) is a security keyboard ISR for protecting keyboard data.

In the HookInterrupt( ) function, a value of keyboard interrupt vector corresponding to IRQ (Interrupt ReQuest) No. 1 that is provided by means of the HallGetInterruptVector( ) function in the OS is fetched and stored in a parameter of nSaveVecNo. Each processor is separately provided with the IDT. Hence, each processor registers the address of the security ISR in the IDT. KeNumberProcessor of the corresponding interrupt indicates the number of processors, and pIdtBase has the address of the IDT stored in the IDTR. OriginalISR is a repository intended to store the address of the keyboard ISR that has been already registered in the IDTR, and MyKdbISR is the address of the security keyboard ISR to take the place of the already registered keyboard ISR. A function of IDT_SetVector( ) serves not only to register SecuKbdISR in the IDT but also to back up the ISR address that has been already installed.

```
void__declspec(naked) SecuKbdISR( )
{
    data = ReadData( );
    if ( Protection_mode )
    {
        ClearBuffer( );
        StoreData( data ):
    }
    else
    {
        WriteKbdBuffer( data );
        CallOriginalISR( );
    }
}
```

When a keyboard interrupt is generated, a function of SecuKbdISR( ) is called. In a function of ReadData( ), the keyboard input data are read from a keyboard buffer through a 60h port. Protection_mode has a value of '1' or '0'. For example, if a current state is a state for protecting keyboard input data, Protection_mode has a value of '1', and if not, Protection_mode has a value of '0'. If Protection_mode is '1', the 60h port is reset to dummy data such as 0F4h (clears output buffer) or 0EE (echo, keyboard responds with EEh) by use of a function of Clearbuffer that serves to reset the keyboard buffer to prevent data from being read through the 60h port. This is a method capable of preventing the data from leaking out by sending the dummy data to the 60h port, although a Keystroke logger carries out a port scanning process of repeatedly reading the 60h port to check input data. Consequently, this is for reinforcing security, which will be described below.

In order to upload the data to application programs, the keyboard input data are stored by using a function of StoreData. If Protection_mode is '0,' the keyboard input data are written again in a keyboard output port without protecting the data in a function of WriteKbdBuffer. In this function, a d2h (write keyboard buffer) 8048 keyboard command is used. Next, OriginalISR that has been stored is called from HookInterrupt( ) by use of a function of CallOriginalISR( ).

Figure 3:
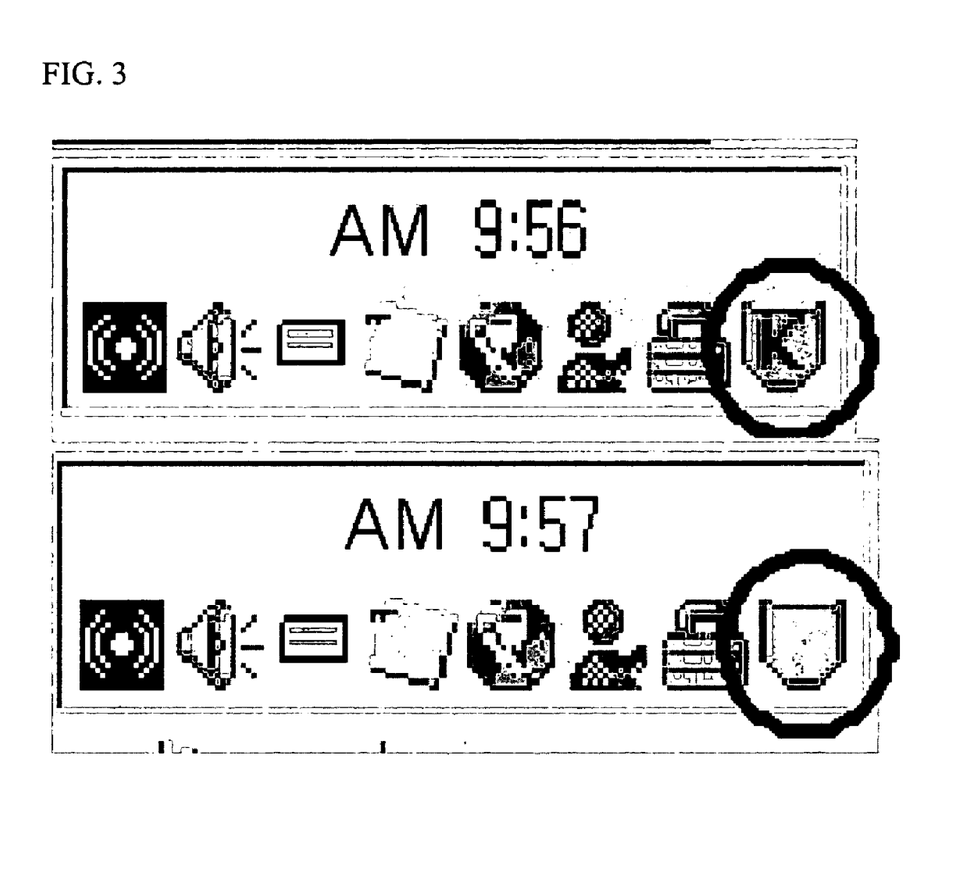
FIG. 3 shows a tray icon as one example of means for informing the user whether the security apparatus of the present invention is normally operated or not.

The security input unit 240 decrypts the data encrypted at the security input device driver 230 into original data, and transmits the decrypted data to an application program 250. When the data are decrypted, the security input unit 240 displays the state that the decryption is completed, and informs a user whether the security system is normally operated by using a tray icon as shown in FIG. 3 or not. In the present embodiment, descriptions are limited to decrypting the encrypted data into the original data and transmitting the decrypted data to the application program 250 from the security input unit 240. In an actual realization, the encrypted data may be decrypted either at the application program 250 or at a specific/designated server in the process of being transmitted through Internet. For instance, in order to satisfy user requirements that a key value should be displayed on a screen of an application program, there may be employed various methods. In the case where the key value should be displayed on the screen of the application program and especially where the key value is a password, a symbol * may be outputted.

Next, the security input device driver 230 will be described in more detail.

The security input device driver 230 includes a data input receiver 231, a data encryptor 232 and a controller 234. If necessary, the security input device driver 230 may further include a monitor 233. The monitor 233 monitors whether the address of the data input receiver 231 registered in the IDT 220 is changed (without a proper user permission) or not. Functions or duties of the monitor 233 will be described in detail below.

The data input receiver 231 reads the data inputted through the data input unit 210 when an interrupt is generated by the data input unit 210, and transmits the data to the data encryptor 232.

The data encryptor 232 encrypts the data received from the data input receiver 231 and transmits the encrypted data to the security input unit 240. In other words, the data inputted through the data input unit 210 are directly encrypted at the security input device driver 230 without passing through the OS input device driver and transmitted to the security input unit 240, so that it make impossible for any hacking program to acquire user's input data and prevents from acquiring the data encrypted at the data encryptor 232. Preferably, the encryption method makes use of a 128-bit encryption scheme based on a Rijndael algorithm that was selected as the proposed encryption algorithm for the US advanced encryption standard (AES). The Rijndael algorithm has excellent performance in security, processing speed, and capability to use a memory. However, this algorithm is a mere example. Therefore, it is apparent that any conventional excellent encryption algorithms may be used.

The controller 234 may be configured to control the monitor 233 and the data encryptor 232, and may control a decryptor 242 of the security input unit 240. In an actual realization, the controller 234 may be separately provided to the security input unit 240.

The security input unit 240 is composed of a decryptor 241 for decrypting the data encrypted at the security input device driver 230 into the original data, and a security state display 242 for informing the decrypted fact and displaying whether the security system is normally operated or not. The security state display 242 is configured to operate together when the data decrypted at the decryptor 241 are transmitted to the application program 250, thus informing the user that the input data are being protected by altering both images of the icon as in FIG. 3. FIG. 3 shows the tray icon as one example of means for assuring an user that the security apparatus of the present invention is normally operated. At this time, the employed icon may be the tray icon or an icon included in the application program.

Figure 4:
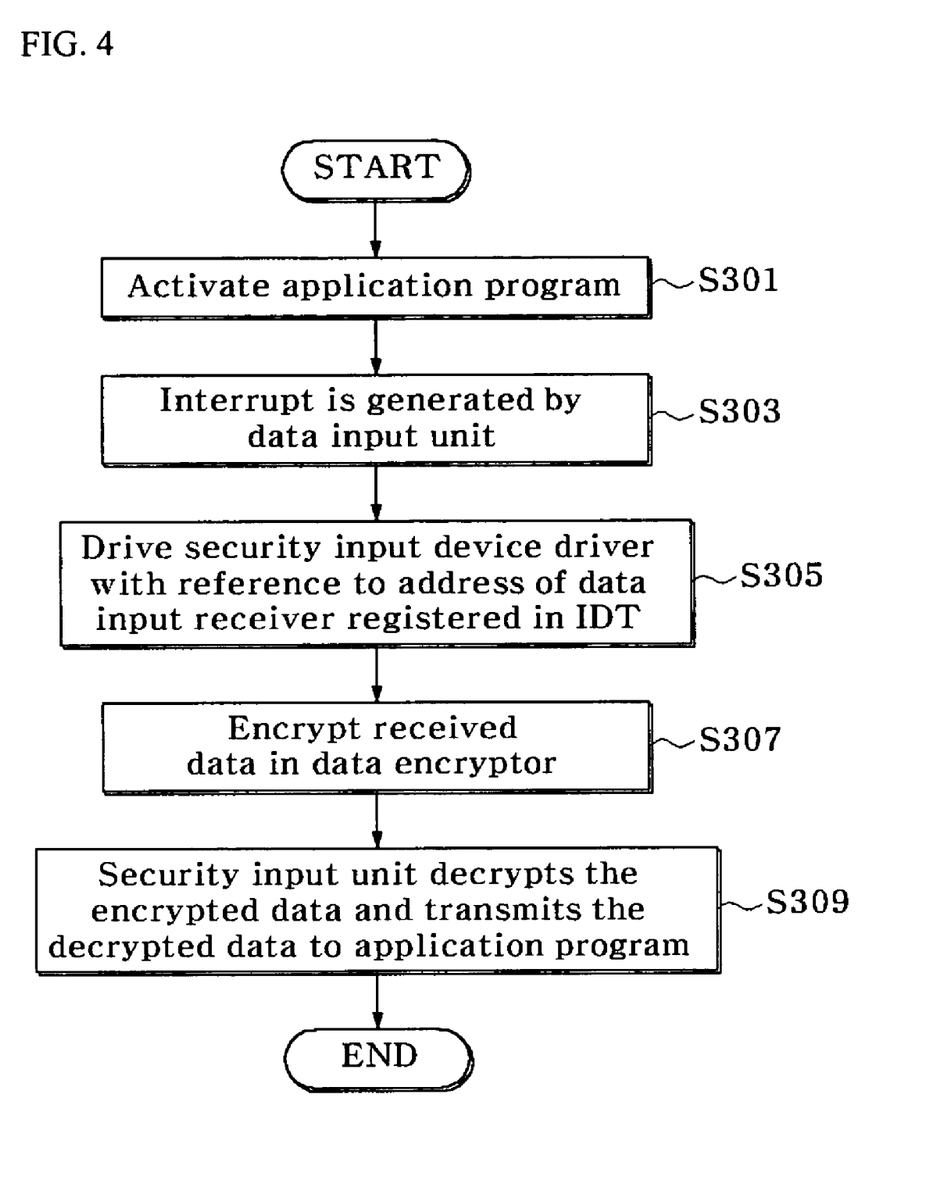
FIG. 4 is a flow chart for explaining a method for protecting data inputted through a data input unit in a computer security apparatus of the present invention.

Hereinafter, operations of the computer security apparatus according to the embodiment of the present invention will be schematically described with reference to FIGS. 4 and 5. FIG. 4 is a flow chart for explaining a method for protecting data inputted through a data input unit in a computer security apparatus of the present invention.

Referring to FIG. 4, when the application program 250 is activated (S301) and then an interrupt is generated by the data input unit 210 (S303), the OS drives the data input receiver 231 of the security input device driver 230 with reference to an address of the data input receiver 231 registered in the IDT 220 (S305). In other words, when the interrupt is generated by the data input unit 210, the OS executes a security ISR, namely the data input receiver 231, rather than the ISR of the OS input device driver, thereby receiving the data inputted through the data input unit 210.

Next, the data encryptor 232 encrypts the data received from the data input receiver 231 (S307) and then transmits the encrypted data to the security input unit 240. The security input unit 240 decrypts the data encrypted at the security input device driver 230 into the original data and then transmits the decrypted data to the application program 250.

Figure 5:
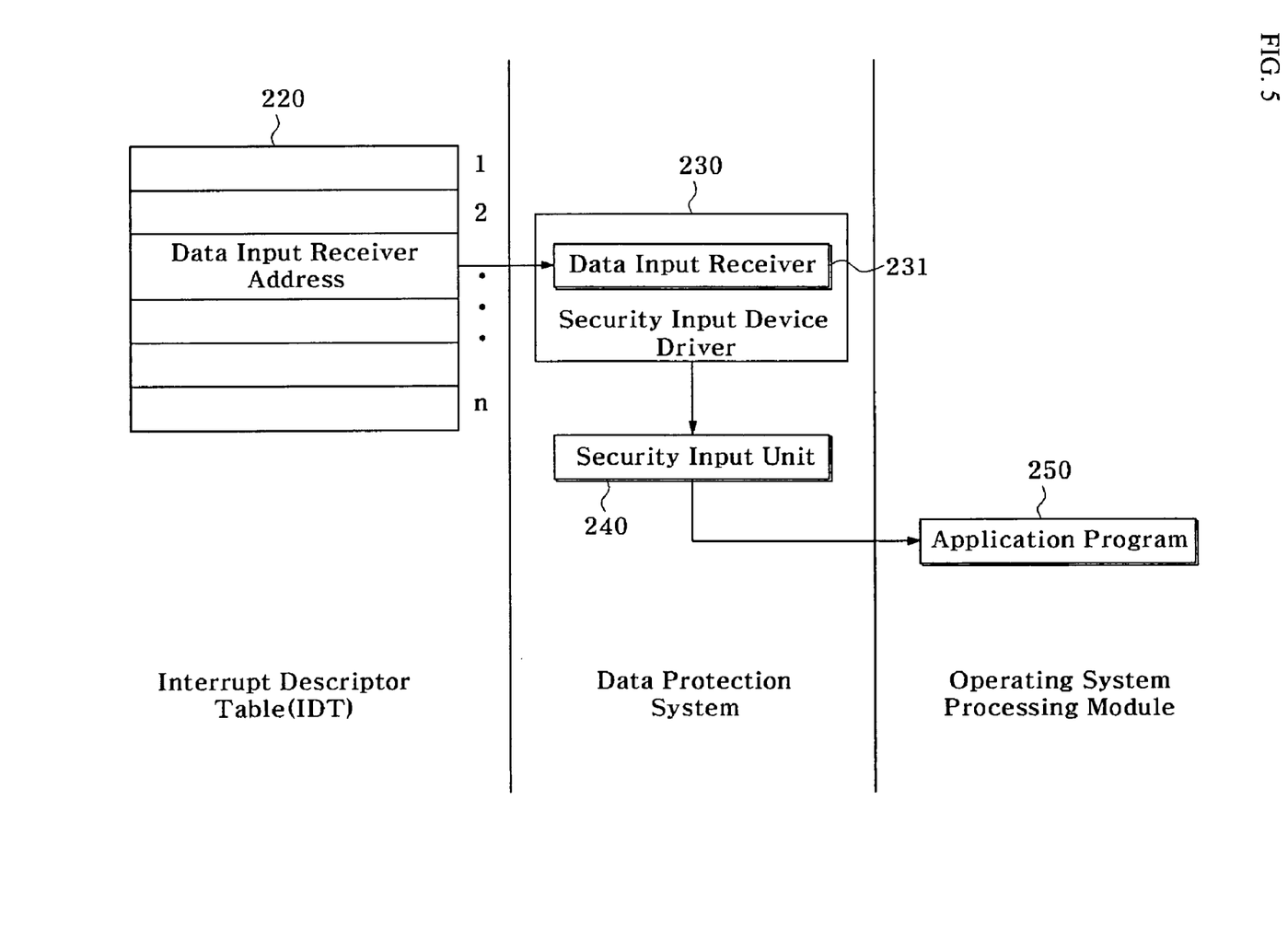
FIG. 5 is a conceptual view for explaining a computer security method according to an exemplary embodiment of the present invention.

FIG. 5 is a conceptual view for explaining a computer security method according to an exemplary embodiment of the present invention. It will be more clearly understood if the computer security method of FIG. 5 is compared with that of FIG. 1.

To be more specific, in the case of the computer security method of FIG. 1, when the keyboard is operated, the OS executes the keyboard ISR with reference to the keyboard ISR address stored in the IDT. By contrast, in the case of that of FIG. 5, the security input ISR is used to process the data inputted from the data input unit instead of the OS input ISR. In other words, according to the present computer security apparatus, a data protection system is first operated before the data are processed by the OS processing module. Owing to this difference, the data inputted through the data input unit can be protected from being illegally acquired by any hacking program from the beginning, although majority of hacking programs are found at an upper level.

Next, a function of the monitor 233 in the computer security apparatus of the present embodiment will be described in more detail. The monitor 233 (FIG. 2) is an optional component, which is a means to reinforce security. The monitor 233 monitors whether the address of the data input receiver 231 registered in the IDT 220 is changed or not, and examines integrity of the security ISR.

Figure 6:
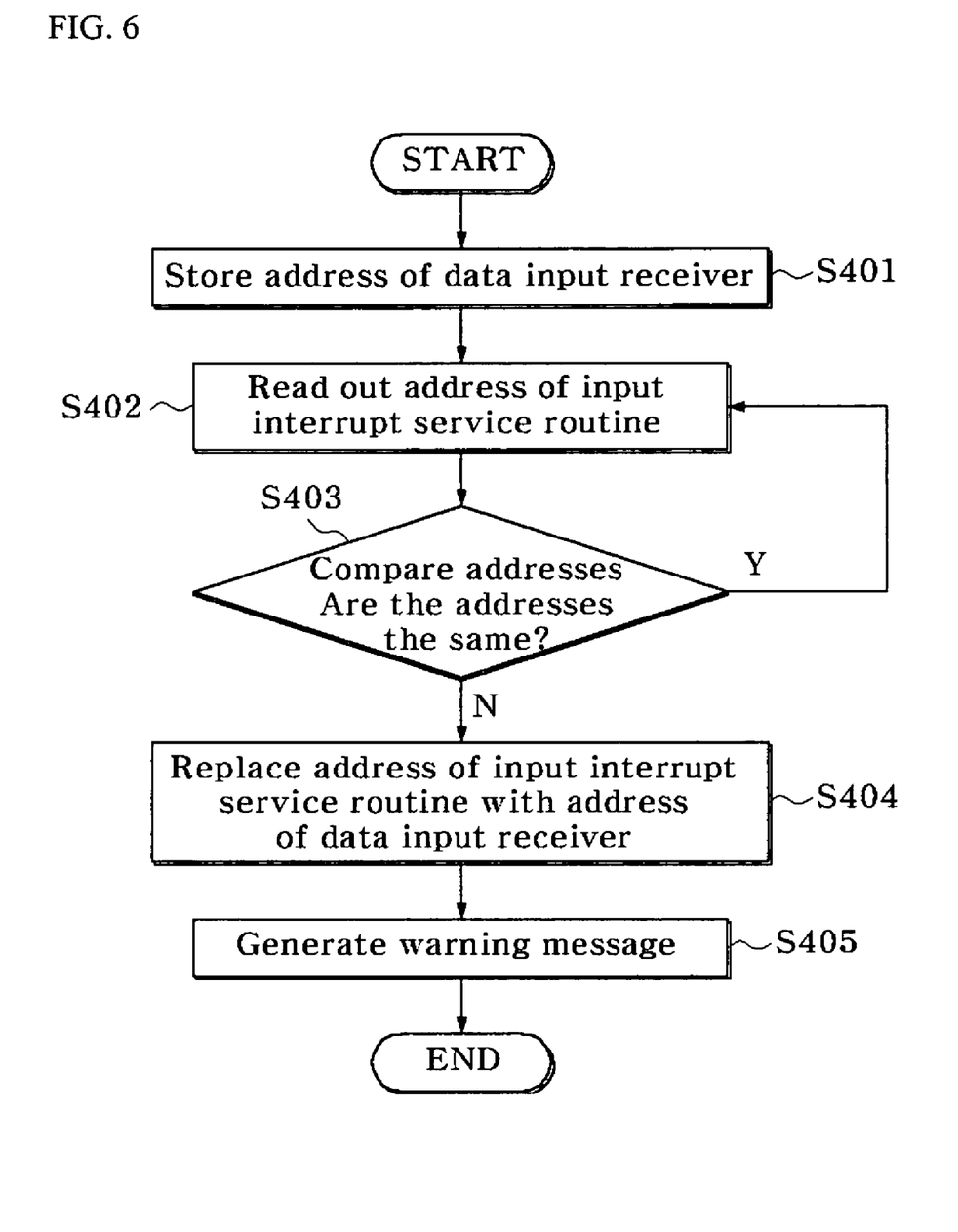
FIG. 6 is a flow chart for explaining a method of monitoring whether an address of a data input receiver registered in the IDT is changed or not by a monitor in a computer security apparatus of the present invention.

FIG. 6 is a flow chart for explaining a method of monitoring whether the address of the data input receiver 231 registered in the IDT 220 is changed or not, by the monitor 233 of FIG. 2.

The monitor 233 stores the address of the data input receiver 231 in advance (S401), and then reads out a value of the address stored in input ISR area of the IDT 220 (S402).

Subsequently, the monitor 233 compares the previously stored address of the data input receiver 231 with that of the input ISR (S403).

As a result of the comparison, if values of two addresses are the same, the steps S402 and S403 are repeated. However, if values of two addresses are different, it is certain that the address of the data input receiver 231 registered in the IDT 220 may have been changed illegally by the hacking program, etc. As such, the changed address of the input ISR area of the IDT 220 is replaced by the address of the data input receiver 231 (S404).

Figure 7:
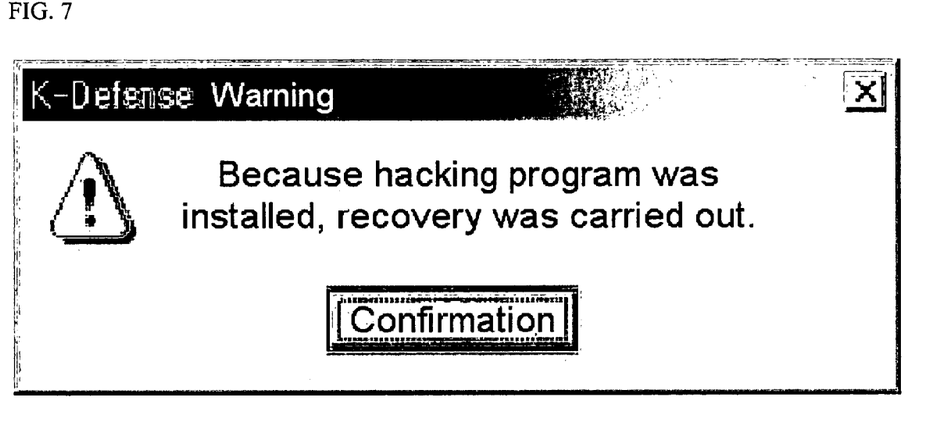
FIG. 7 shows one example of a screen displaying a security state according to an exemplary embodiment of the present invention.

And, the monitor 233 informs such a fact to the controller 234. Then, the controller 234 informs the fact to the user by displaying a message window as shown in FIG. 7 on the screen (S405).

Next, methods capable of improving security will be described in addition to the concept of registering the security ISR in the IDT. The following are some of weaknesses and solutions that are present in the step of registering the security ISR in the IDT.

The first weakness is a method similar to that of registering the security ISR. After the address of the security ISR is registered in the IDT, countermeasures against a method of registering the security ISR address as the ISR address for illegal data acquisition are required. In other words, when any malicious keystroke logger program changes the address of the data input receiver 231 (of FIG. 2) registered in the input ISR area of the IDT 220 in order to acquire keystroke data, the input data are not normally received into the data input receiver 231, thus being transmitted to a undesired place changed by the keystroke logger program.

As the countermeasures for preventing this problem, for example, the monitor 233 may be configured to continuously monitor the address of the data input receiver 231, and then, when the address of the data input receiver 231 is changed, to transmit the changed fact to the controller 234, and to change the changed address of the input ISR area into the address of the data input receiver 231 again. In this case, the controller 234 receiving the fact may inform the fact to the user by displaying a warning message window on the screen.

Figure 8:
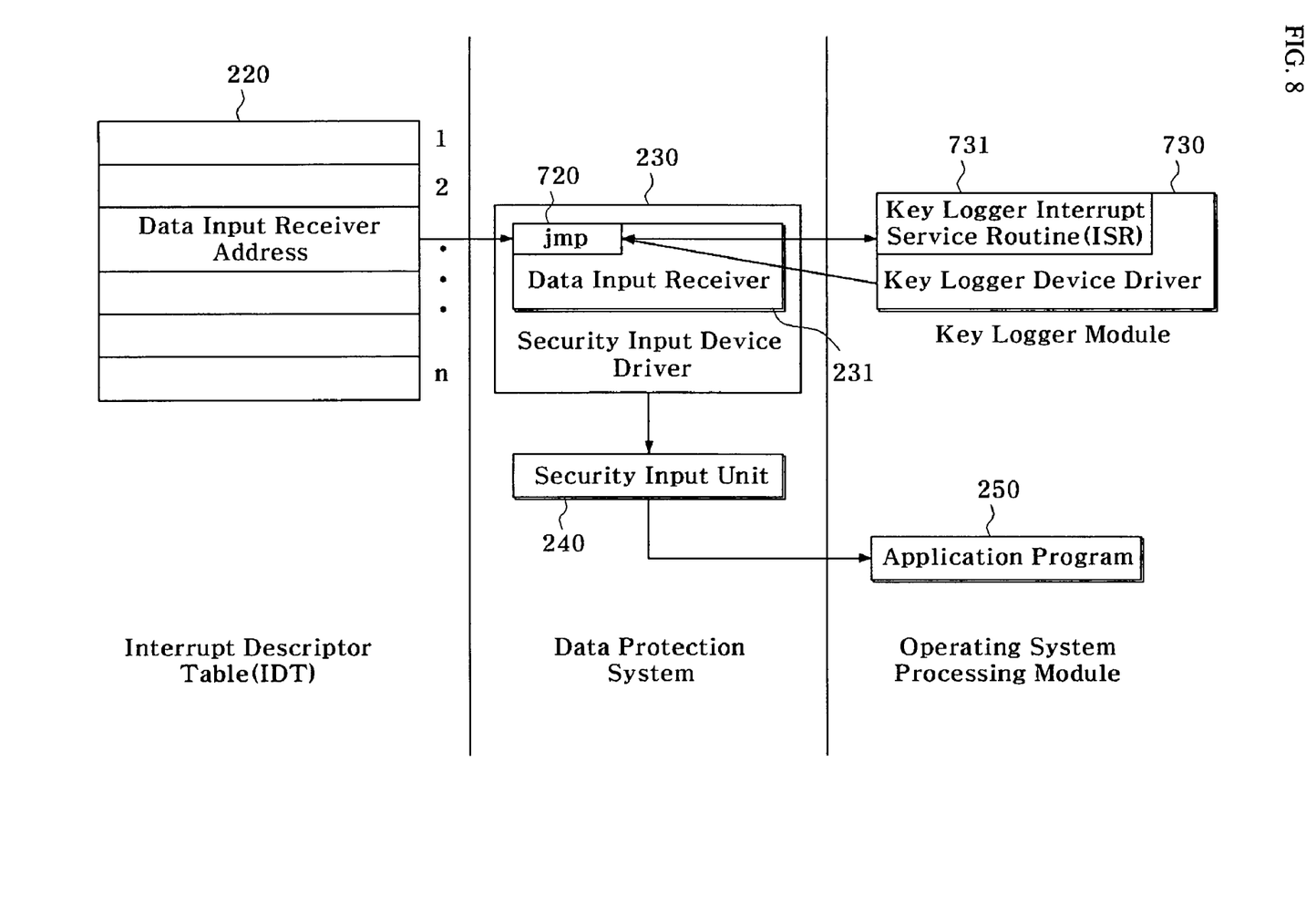
FIG. 8 is a conceptual view for explaining a method of inserting a jump binary code into a security ISR in a computer security apparatus of the present embodiment, in which a situation of violating security is explained.

The second weakness is a method of inserting a jump binary code into the security ISR, which may involve a technique used for API hooking by way of an example. FIG. 8 is a conceptual view showing a method of inserting the jump binary code into the security ISR in the computer security apparatus of the present embodiment, in which a situation of violating security will be explained. Describing this method with reference to FIG. 8, a binary code, jmp, 720 jumping to an address of a undesired function 730 is inserted in a function area for illegal data acquisition, and a function of a malicious ISR designated prior to the security ISR is executed when an interrupt is generated. Thereby, data are received and stored, and then jumped to the security ISR.

Figure 9:
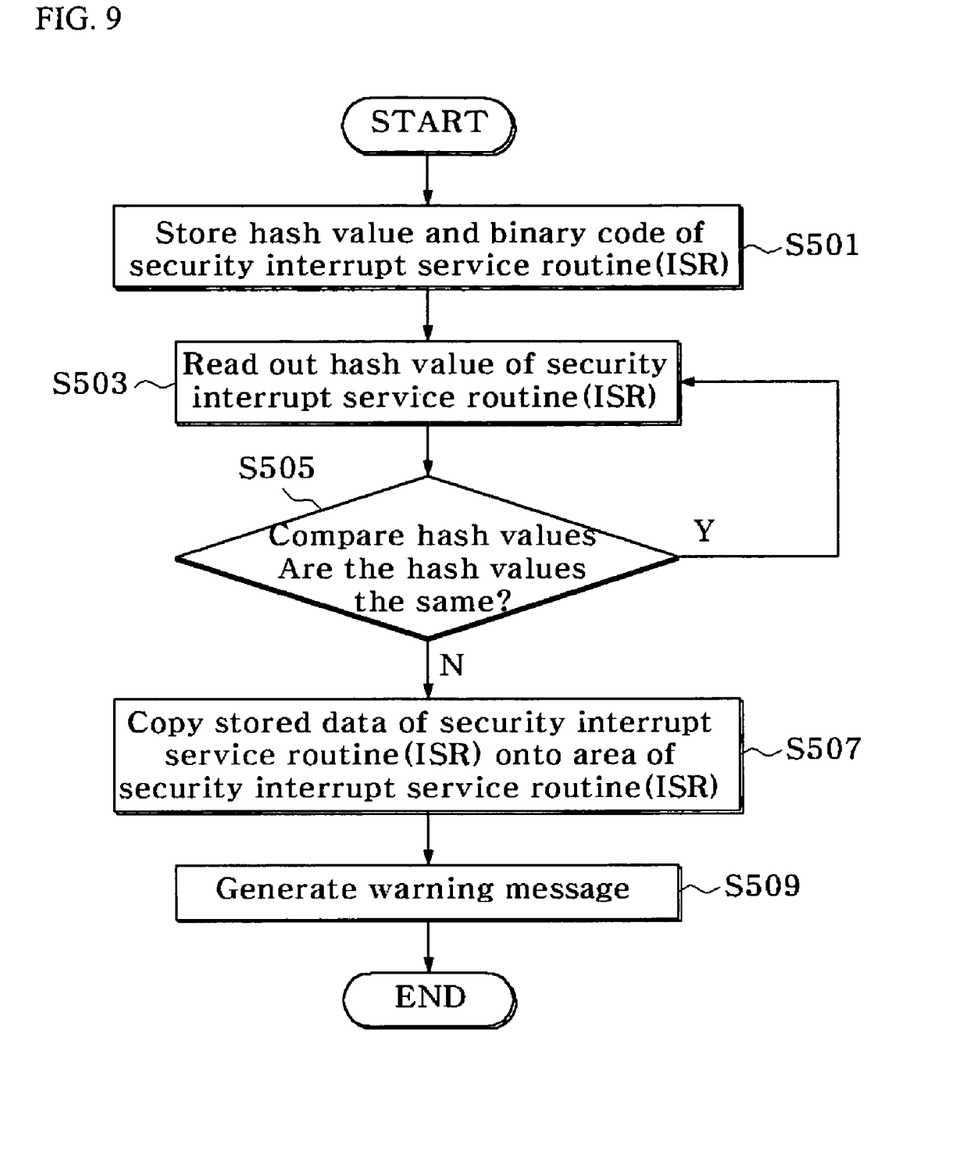
FIG. 9 is a flow chart for explaining a process for solving a problem of violating security by means of a method of inserting a jump binary code into a security ISR in a computer security apparatus of the present embodiment.

FIG. 9 is a flow chart for explaining a process for solving a problem of violating security by means of a method of inserting a jump binary code into a security ISR in a computer security apparatus of the present embodiment. The second solution will be described with reference to FIG. 9. To begin with, a hash value and a binary code of the security ISR are stored in advance (S501). A current hash value of the security ISR is read out (S503). Then, a binary code of the security ISR is inserted by using a checksum or hashing algorithm so as to be capable of checking integrity of the data. In other words, in order to verify whether the jump binary code has been inserted or not, it is determined based on a comparison of the read hash value and the stored hash value (S505). From a result of the comparison, if two values are not equal to each other, the binary code of the security ISR which have been stored in consideration of when integrity of the data is damaged is recovered with an original code (S507), and the result is transmitted to the controller 234. The controller 234 may inform the result to the user by displaying a message window on a screen.

Figure 10:
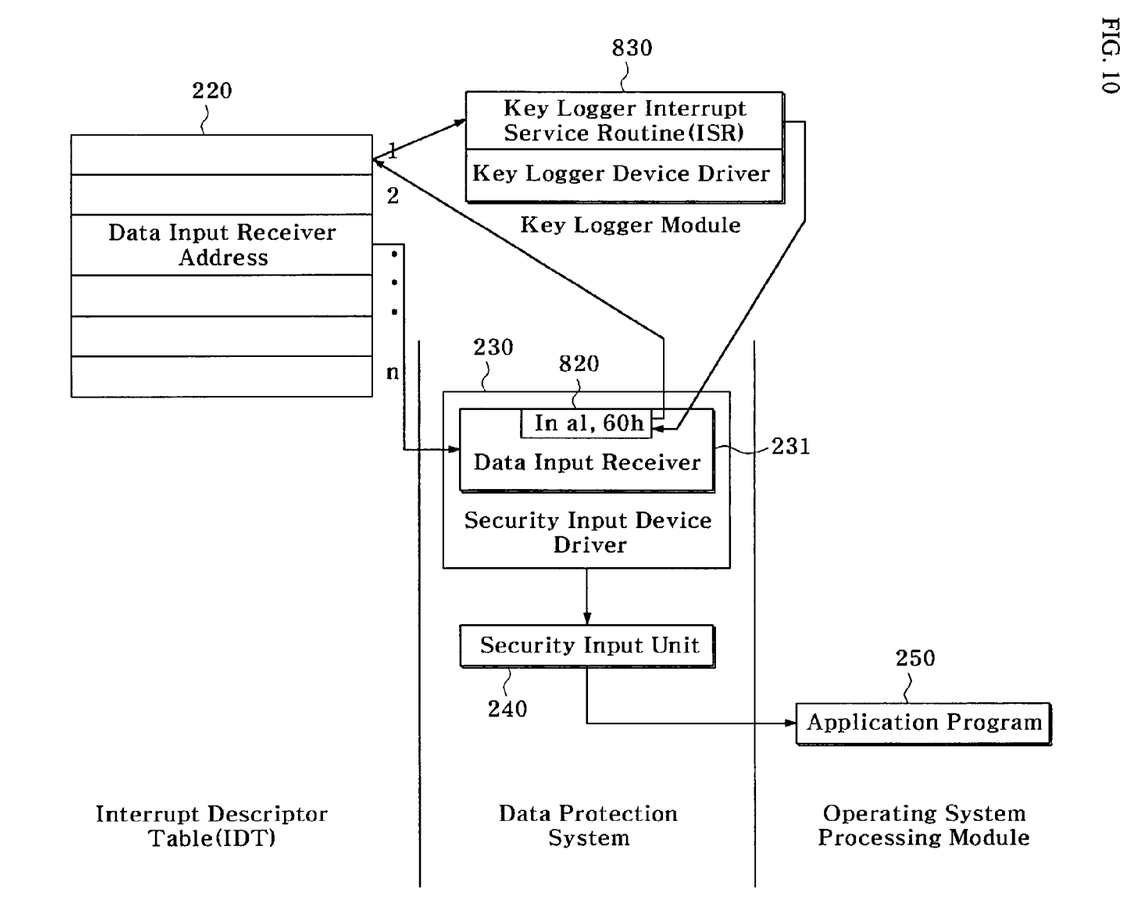
FIG. 10 is a conceptual view for explaining a method of jumping to a trap ISR before a security ISR is called, in which a situation of violating security is explained.

The third weakness is a method of jumping to a trap ISR before a security ISR is called, in which a situation of violating security will be described with reference to FIG. 10. A keystroke logger ISR is registered in a trap IDT. A DE (Debug Extensions) flag in a control register CR4 is enabled. A debug control register DR7 performs I/O read or write by use of a port number set in a debug control register DR0. In this case, setting is performed to generate a processor interrupt, and 60h is set in the debug control register DR0. Therefore, when a keyboard is operated, a registered security ISR is called. When input data are read by a 60h port, e.g. in al, 60h, in the ISR, CPU (Central Processing Unit) that is monitoring the port generates an interrupt, Jumping to the keystroke logger ISR registered in the trap IDT takes place. The keystroke logger ISR reads data from an AL register and stores the data, and returns to the position before jumping when processing of the trap ISR is completed. As the countermeasures against this process, the DE flag of the control register CR4 may be periodically disabled so as not to jump to the trap ISR using the debug control register, and the debug control register DR7 may be disabled.

The fourth weakness is a port scanning method of checking input data by repeatedly reading a 60h port for input and output of a keyboard or mouse. Here, countermeasures against acquisition of data using the port scanning method are required. As mentioned above, if a current state is a state for protecting keyboard input data, Protection_mode has a value of '1'. If not, Protection_mode has a value of '0'. Thus, in order to prepare for data acquisition using the port scanning method, when Protection_mode has a value of '1', the 60h port may be reset with dummy data such as 0F4h (clears output buffer) or 0EE (echo, keyboard responds with EEh) by use of a function of Clearbuffer that serves to reset the keyboard buffer to prevent data from being read through the 60h port.

Meanwhile, a program for applying the computer security method of the present invention is recorded into a storing medium such as CD (Compact Disk), floppy disk, memory stick or so forth, is sold as a product, and is installed in each computer in an off-line manner by an user. The program for applying the computer security method may be applied when specified programs or any other programs are used. Unlike to this, the program for applying the computer security method is automatically or manually downloaded and installed in a file form on getting access to a specified site through Internet. When the user inputs data through the data input unit such as the keyboard in order to transmit information to a desired site through a web browser such as INTERNET EXPLORER, the program for applying the computer security method may be executed.

According to the present invention, it is possible to prevent the data inputted from the computer input unit from being intercepted and transmitted to a third party by any hacking tool installed in the computer system, so that the users' keystroke data can be securely transmitted to the application program.

Further, the security system of the present invention is adapted to directly encrypt the data inputted through the data input unit through the security input device driver rather than the OS input device driver supporting in the OS. Thereby, the data inputted through the data input unit can be prevented from being illegally acquired by any hacking program from the beginning, although majority of hacking programs are installed at an upper step.

Furthermore, the addition of a fundamental principle of storing the address of the security input ISR in the address area of the OS input ISR allows various weaknesses existing in the step of registering the security ISR in the IDT to be eliminated.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A computer security method using a security input device driver, comprising:
   when an interrupt is generated by a data input unit, driving the security input device driver with reference to an address of a data input receiver serving as a security interrupt service routine ("ISR"), the address of the data input receiver being previously registered in an interrupt descriptor table ("IDT");
   encrypting data received from the data input receiver and transmitting the encrypted data;
   decrypting the encrypted data and transmitting the decrypted data to an application program;
   monitoring whether the address of the data input receiver registered in the IDT is changed or not by a malicious keystroke logger program for changing the address of the data input receiver registered in the IDT to a different address value designated for an undesired section to which the malicious keystroke logger program intends to transmit data input; and
   restoring the address of the data input receiver registered in the IDT in the case that the address of the data input receiver registered in the IDT has been changed by the malicious keystroke logger program.

2. A recording medium of recording a program for executing the computer security method using the security input device driver, the method using a security input device driver, comprising:
   when an interrupt is generated by a data input unit, driving the security input device driver with reference to an address of a data input receiver serving as a security interrupt service routine ("ISR"), the address of the data input receiver being previously registered in an interrupt descriptor table ("IDT");
   encrypting data received from the data input receiver and transmitting the encrypted data;
   decrypting the encrypted data and transmitting the decrypted data to an application program;
   monitoring whether the address of the data input receiver registered in the IDT is changed or not by a malicious keystroke logger program for changing the address of the data input receiver registered in the IDT to a different address value designated for an undesired section to which the malicious keystroke logger program intends to transmit data input; and
   restoring the address of the data input receiver registered in the IDT in the case that the address of the data input receiver registered in the IDT has been changed by the malicious keystroke logger program.

3. A computer security apparatus using a security input device driver, comprising:
   an interrupt descriptor table ("IDT") for storing a list of addresses of functions taking charge of an interrupt and storing an address of a security input interrupt service routine ("ISR") in a part of an address area of an operating system ("OS") input ISR provided by the OS;
   the security input device driver for, when the interrupt is generated by a data input unit, executing the security input ISR based on the address of the security input ISR to receive data through the data input unit and encrypting the received data; and
   a security input unit for decrypting the data encrypted at the security input device driver and transmitting the decrypted data to an application program;
   a data input receiver for receiving the data inputted from the data input unit if the security input ISR is executed;
   a data encryptor for encrypting the data received by the data input receiver;
   a monitor for monitoring whether an address of the data input receiver registered in the IDT is changed or not by a malicious keystroke logger program for changing the address of the data input receiver registered in the IDT to a different address value designated for an undesired section to which the malicious keystroke logger program intends to transmit the data received by the data input receiver, and for restoring the address of the data input receiver registered in the IDT in the case that the address of the data input receiver registered in the IDT has been changed by the malicious keystroke logger program; and
   a controller for controlling operation of the security input device driver.

4. The computer security apparatus of claim 3, wherein the monitor is configured to compare the registered address of the data input receiver with an address of an input ISR area of the IDT corresponding to the data input unit, and when the address of the input ISR area is changed, to replace the changed address with the registered address of the data input receiver again.

* * * * *